Patented Dec. 14, 1943

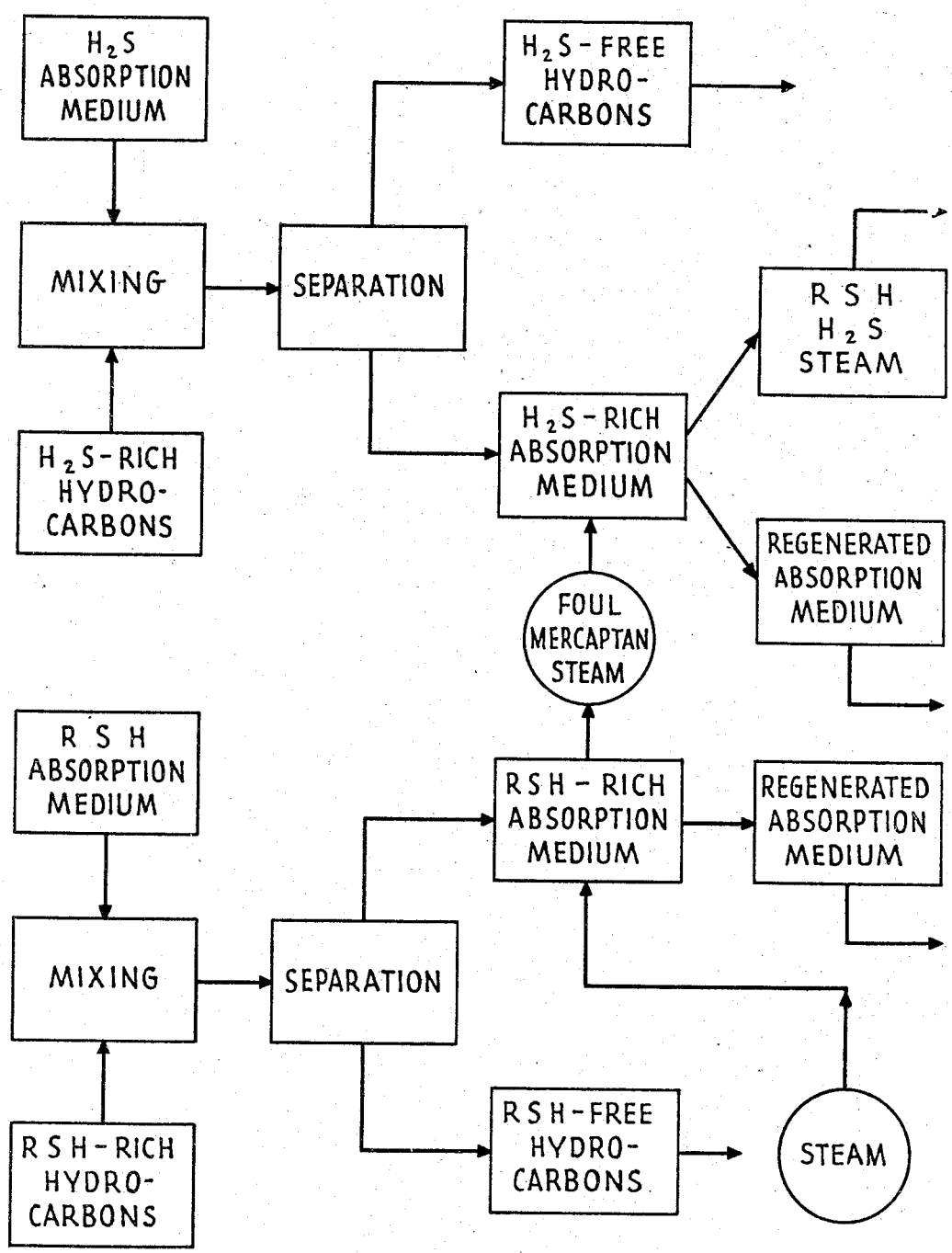

2,336,896

UNITED STATES PATENT OFFICE 2,336,896

UTILIZATION OF FOUL STEAM FOR HYDROGEN SULPHIDE REMOVAL

William H. Shiffler, San Francisco, and Laverne P. Elliott, Berkeley, Calif., assignors to Standard Oil Company of California, San Francisco, Calif., a corporation of Delaware Original application December 9, 1940, Serial No. 369,230. Divided and this application December 16, 1942, Serial No. 469,190

4 Claims. (Cl. 196—30)

This application is a division of our application, Serial No. 369,230, filed December 9, 1940, entitled "Utilization of foul steam for hydrogen sulphide removal."

Most hydrocarbons obtained from petroleum, and particularly gasoline, must be treated for removal of hydrogen sulphide and mercaptans. In addition to other improvements, such removal sweetens the odor of the treated hydrocarbons and in the production of gasoline improves the tetraethyl lead susceptibilities thereof.

For various reasons it is customary to remove the main bodies of hydrogen sulphide and mercaptans in separate treating operations. Customarily, the hydrogen sulphide is first removed.

There are various methods of removing said hydrogen sulphide, included among which are washing with aqueous alkaline solutions, scrubbing with amine solutions, or with potassium salts of phosphoric acid, such as tri-potassium phosphate or with sodium phenolate. The removal of hydrogen sulphide with aqueous alkaline solutions has long been used and the methods of such use are familiar to those skilled in the art. The removal of hydrogen sulphide with the use of tri-potassium phosphate is described in "Proceedings of Eighth Mid-Year Meeting—American Petroleum Institute" (vol. 19M, 1938, pages 47–53) in a paper presented by T. W. Rosebaugh. The use of sodium phenolate as the absorption medium has been described in "Proceedings of Eighth Mid-Year Meeting—American Petroleum Institute" (vol. 19M, 1938, pages 23–33). The process of using amine solutions is described in "Proceedings of Eighth Mid-Year Meeting—American Petroleum Institute" (vol. 19M, 1938, pages 34–36) in a paper presented by Wood and Storrs. The use of aliphatic and cycloparaffin amines has been found especially desirable.

Various methods also exist for removal of mercaptans, chief among which is scrubbing with aqueous alkaline solutions such as sodium or potassium hydroxide, with or without the aid of suitable organic solvents or organic acids which increase the solubility of the aqueous alkaline solution for the mercaptans. The removal of mercaptans by scrubbing with aqueous alkaline solutions has long been employed and the methods of such use are familiar to those skilled in the art.

In processes of chemically refining hydrocarbons, in order that the process may be economically employable, it is normally necessary to regenerate the chemicals employed so that they may be re-used. This is also true in the various processes for removal of hydrogen sulphide and mercaptans from hydrocarbons. Chemicals used in the removal of hydrogen sulphide and mercaptans are regenerated by steaming the spent solutions containing the removed hydrogen sulphide and mercaptans. For instance, in the removal of mercaptans by use of caustic soda the mercaptans are converted into mercaptides and the hydrolysis resulting from the subsequent steaming of the spent caustic solution regenerates the caustic and releases the mercaptans with the steam. In the removal of hydrogen sulphide by use of tri-potassium phosphate or amine solutions the reaction may be represented as the absorption of hydrogen sulphide by a weak base. Upon steaming the spent treating solution the reaction is reversed, hydrogen sulphide is given off and the tri-potassium phosphate or amine solution regenerated.

In all the processes for removal of hydrogen sulphide and mercaptans involving the regeneration of the chemical employed by steaming, the generation of the necessary steam is one of the major items of expense. In fact, in the operation of the amine or tri-potassium phosphate hydrogen sulphide removal processes, since no chemicals are consumed, the main item of operating expense is the generation of the steam necessary to regenerate the spent treating solution. For instance, in a plant capable of treating approximately four and a half million cubic feet per day of hydrocarbon gas containing hydrogen sulphide from 3,000 to 8,000 pounds of steam per hour are required.

The steam employed in regenerating aqueous alkali solutions used for removing mercaptans from gasoline is customarily wasted. Not only is such steam wasted, but, because it contains the removed foul-smelling mercaptans, it presents a serious disposal problem. See, for instance, the paper presented by William Medius, before the Mid-Year Meeting, American Petroleum Institute, Tulsa, Oklahoma, June 1–3, 1932, entitled "Closed System Effective for Disposal of Sulfur Gases in Refinery."

Applicants have discovered that the foul mercaptan-containing steam from the regeneration of aqueous alkali solutions used in removing mercaptans from gasoline, which is normally wasted, can instead be employed to regenerate treating solutions used to remove hydrogen sulphide from hydrocarbons.

Contrary to what was reasonably to be expected, when the foul mercaptan-containing steam is used to regenerate the spent solution used to absorb hydrogen sulphide, the spent-tripotassium phosphate solution for instance, there is substantially no absorption of the mercaptans in the hydrogen sulphide absorption medium being regenerated and there is no polluting of the hydrocarbons from which the hydrogen sulphide is being removed by the mercaptans in the steam employed.

Our invention can be described by reference to the accompanying drawing in the form of a flow sheet. In the lower line of flow, hydrocarbons containing mercaptans are admixed in a conventional manner with the mercaptan absorption medium followed by conventional separation of the absorption medium, now containing the entrained mercaptans, from the hydrocarbons stripped of mercaptans. In the upper line of flow, hydrocarbons containing hydrogen sulphide are admixed in a conventional manner with the hydrogen sulphide absorption medium, followed by conventional separation of the absorption medium, now containing the entrained hydrogen sulphide, from the hydrocarbons stripped of hydrogen sulphide. In order that the respective absorption media may be recycled for further absorption they are regenerated by the use of steam. Free steam is introduced into the mercaptan-rich absorption medium for such purpose. Such regeneration step may be assisted by the additional use of a closed steam coil. The free steam emerging from mercaptan absorption medium regenerator, containing the mercaptan removed from the mercaptan absorption medium, is passed directly to the hydrogen sulphide absorption medium regenerator where it is employed to drive off the hydrogen sulphide entrained in the hydrogen sulphide absorption medium and thus regenerate the hydrogen sulphide absorption medium. The driving off of the entrained hydrogen sulphide may be assisted by the additional use of a closed steam coil. The hydrocarbons thus freed of mercaptans and hydrogen sulphide may be passed to storage, recycled or otherwise treated in any desired manner. The regenerated mercaptan and hydrogen sulphide absorption mediums are recycled for further absorption of mercaptans and hydrogen sulphide. The byproducts of the process, namely the hydrogen sulphide and the mercaptans, may be put to any desired and appropriate use, such as the manufacture of sulphur or sulphuric acid.

The ultilization of the foul mercaptan-rich steam, which has heretofore been with difficulty disposed of or wasted, in order to regenerate the treating solution used to remove hydrogen sulphide, constitutes a major economy in refinery operations directed to the removal of mercaptans and hydrogen sulphide.

The process described herein is applicable to removal of hydrogen sulphide and mercaptans from both gaseous and liquid hydrocarbons.

We claim:

1. The process comprising mixing hydrocarbons containing mercaptans with an aqueous alkaline solution in order to remove said mercaptans from said hydrocarbons, separating said hydrocarbons thus freed of mercaptans from said aqueous alkaline solution, regenerating said aqueous alkaline solution for further use in mercaptan absorption by steaming the same, passing the foul, mercaptan-containing steam to a hydrogen sulphide removal treatment wherein hydrocarbons containing hydrogen sulphide are contacted with an alkaline liquid absorption medium for hydrogen sulphide comprising a solution containing potassium salts of phosphoric acid to absorb at least a substantial portion of said hydrogen sulphide in said solution after which the hydrogen sulphide-freed hydrocarbons are separated from the solution containing potassium salts of phosphoric acid and said absorption medium is regenerated for reuse, and employing said foul, mercaptan-containing steam from the mercaptan-removal system to regenerate said solution containing potassium salts of phosphoric acid and to evolve hydrogen sulphide therefrom.

2. The process comprising mixing hydrocarbons containing mercaptans with an aqueous alkaline solution in order to remove said mercaptans from said hydrocarbons, separating said hydrocarbons thus freed of mercaptans from said aqueous alkaline solution, regenerating said aqueous alkaline solution for further use in mercaptan absorption by steaming the same, passing the foul, mercaptan-containing steam to a hydrogen sulphide removal treatment wherein hydrocarbons containing hydrogen sulphide are contacted with a liquid absorption medium for hydrogen sulphide comprising a solution containing tri-potassium phosphate to absorb at least a substantial portion of said hydrogen sulphide in said solution after which the hydrogen sulphide-freed hydrocarbons are separated from the solution containing tri-potassium phosphate and said absorption medium is regenerated for reuse, and employing said foul, mercaptan-containing steam from the mercaptan-removal system to regenerate said solution containing tri-potassium phosphate and to evolve hydrogen sulphide therefrom.

3. In a process of treating hydrocarbons to remove hydrogen sulphide by absorption in an alkaline liquid absorption medium capable of regeneration by steam and comprising an aqueous solution containing potassium salts of phosphoric acid, the steps of removing hydrogen sulphide absorbed in said absorption medium by steaming said absorption medium with steam fouled with mercaptans previously extracted from hydrocarbons in a mercaptan absorption step, removing both hydrogen sulphide and said mercaptans in the exhaust steam from said steaming operation, and recycling said absorption medium to remove hydrogen sulphide from hydrocarbons substantially without introducing mercaptans therein.

4. A process as in claim 3, wherein said alkaline liquid absorption medium for hydrogen sulphide is a solution containing tri-potassium phosphate.

WILLIAM H. SHIFFLER.
LAVERNE P. ELLIOTT.